United States Patent
Kambara

(10) Patent No.: US 11,398,748 B2
(45) Date of Patent: Jul. 26, 2022

(54) IN-VEHICLE BACKUP POWER SUPPLY CONTROL DEVICE AND IN-VEHICLE BACKUP POWER SUPPLY

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Hisanori Kambara, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 17/299,552

(22) PCT Filed: Nov. 27, 2019

(86) PCT No.: PCT/JP2019/046263
§ 371 (c)(1),
(2) Date: Jun. 3, 2021

(87) PCT Pub. No.: WO2020/116261
PCT Pub. Date: Jun. 11, 2020

(65) Prior Publication Data
US 2022/0029452 A1    Jan. 27, 2022

(30) Foreign Application Priority Data
Dec. 3, 2018 (JP) .............................. JP2018-226513

(51) Int. Cl.
H02J 9/06 (2006.01)
H02J 7/00 (2006.01)
B60R 16/033 (2006.01)

(52) U.S. Cl.
CPC .............. *H02J 9/06* (2013.01); *B60R 16/033* (2013.01); *H02J 7/0047* (2013.01);
(Continued)

(58) Field of Classification Search
None
See application file for complete search history.

(56) References Cited

U.S. PATENT DOCUMENTS

2017/0179760 A1* 6/2017 Jawany ................... H02J 9/061
2019/0173274 A1  6/2019 Fukae
2019/0299798 A1* 10/2019 Oyama ................... B60L 50/51

FOREIGN PATENT DOCUMENTS

JP    2017-070057 A    4/2017
JP    2018-170821 A    11/2018

OTHER PUBLICATIONS

International Search Report, Application No. PCT/JP2019/046263, dated Jan. 7, 2020.

* cited by examiner

*Primary Examiner* — Jared Fureman
*Assistant Examiner* — Aqeel H Bukhari
(74) *Attorney, Agent, or Firm* — Honigman LLP

(57) ABSTRACT

Provided is an in-vehicle backup power supply control device or an in-vehicle backup power supply configured to generate a notification indicating the state of a power storage unit to an external device. When a main power supply fails, a control device applies a voltage to a backup target load from a power storage unit. The control device is provided with a charging/discharging unit for charging the power storage unit and discharging the power storage unit, a (Continued)

voltage detection unit for detecting a voltage of the power storage unit, a control unit for controlling the operation of the charging/discharging unit, and a signal interruption unit for interrupting the output of the predetermined signal to a device external to the control device in a case where the voltage value (Vout) of the power storage unit detected by the voltage detection unit is smaller than a predetermined first threshold.

8 Claims, 6 Drawing Sheets

(52) U.S. Cl.
CPC ........ *H02J 7/0068* (2013.01); *H02J 7/00714* (2020.01); *H02J 7/007182* (2020.01)

IN-VEHICLE BACKUP POWER SUPPLY CONTROL DEVICE AND IN-VEHICLE BACKUP POWER SUPPLY

CROSS-REFERENCE TO RELATED APPLICATIONS

This application is the U.S. national stage of PCT/JP2019/046263 filed on Nov. 27, 2019, which claims priority of Japanese Patent Application No. JP 2018-226513 filed on Dec. 3, 2018, the contents of which are incorporated herein.

TECHNICAL FIELD

The present disclosure relates to an in-vehicle backup power supply control device and an in-vehicle backup power supply.

BACKGROUND

JP 2017-70057A discloses a backup power supply in which two converters are used to charge a power storage unit and supply power to a backup target load. The backup power supply can supply power without decreasing a supply voltage by using the converter for supplying power to the load.

Originally, in a case where a power storage unit is insufficiently charged and power cannot be supplied from the power storage unit to a backup target load, a notification indicating that the power storage unit is in an abnormal state needs to be made to the backup target load and displays such as a meter and an indicator, but in the case where a charging/discharging unit that charges and discharges the power storage unit itself fails, there is a possibility that a notification indicating that the power storage unit cannot supply power from the power storage unit to the backup target load cannot be made to an external device. For this reason, if higher reliability is required, this problem cannot be addressed with the above-described configuration as-is. Further, if components are added in order to ensure higher reliability, cost and size may increase.

The present disclosure has been made in view of the above-described circumstances, and an object of the present disclosure is to provide an in-vehicle backup power supply control device or an in-vehicle backup power supply that can favorably make a notification indicating the state of a power storage unit to an external device while suppressing cost and size.

SUMMARY

An in-vehicle backup power supply control device according to a first disclosure is an in-vehicle backup power supply control device for performing control, in an in-vehicle power supply system provided with a main power supply and a power storage unit, such that the power storage unit supplies power to a backup target load in a case where the main power supply fails. The in-vehicle backup power supply control device includes: a charging/discharging unit configured to charge and discharge the power storage unit; a voltage detection unit configured to detect a charging voltage of the power storage unit; a control unit configured to output a predetermined signal to a device external to the control device; and a signal interruption unit configured to interrupt the output of the predetermined signal to the device external to the control device in a case where the charging voltage detected by the voltage detection unit is smaller than a predetermined threshold.

An in-vehicle backup power supply control device according to a second disclosure is: an in-vehicle backup power supply control device for performing control, in an in-vehicle power supply system provided with a main power supply and a power storage unit, such that the power storage unit supplies power to a backup target load in a case where the main power supply fails. The in-vehicle backup power supply control device includes a charging/discharging unit configured to charge and discharge the power storage unit; a voltage detection unit configured to detect a charging voltage of the power storage unit; a current detection unit configured to detect a value of a current that flows to the power storage unit or a current that flows from the power storage unit; a control unit configured to output a predetermined signal to a device external to the control device; and a signal interruption unit configured to interrupt the output of the predetermined signal to the device external to the control device in a case where the charging voltage detected by the voltage detection unit is smaller than a predetermined threshold and the current value detected by the current detection unit is smaller than a predetermined current threshold.

An in-vehicle backup power supply according to a third disclosure includes the in-vehicle backup power supply control device according to the first disclosure or the second disclosure, and the power storage unit.

Advantageous Effects of Disclosure

In the in-vehicle backup power supply control device according to the first disclosure, since the voltage detection unit and the signal interruption unit are provided, the output of a predetermined signal to a device external to the control device can be interrupted in the case where the charging voltage is smaller than a predetermined threshold. In this manner, if the charging voltage is smaller than a predetermined threshold, the output of a predetermined signal can be interrupted, and thus the state of the charging voltage of the power storage unit can be grasped by the external device according to whether or not the predetermined signal has been output. In this manner, a notification indicating the state of the charging voltage of the power storage unit can be made to the external device using a function of a path for transmitting a predetermined signal from the control unit, without newly providing a specific dedicated communication line, a dedicated communication port, or the like.

In the signal interruption unit of the in-vehicle backup power supply control device according to the second disclosure, since the voltage detection unit and the signal interruption unit are provided, the output of a predetermined signal to a device external to the control device can be interrupted in the case where the charging voltage is smaller than a predetermined threshold and the current value detected by the current detection unit is smaller than a predetermined current threshold. In this manner, a notification indicating the state of the power storage unit can be made to the external device using the function of the path for transmitting a predetermined signal from the control unit, without newly providing a specific dedicated communication line, a dedicated communication port, or the like.

According to the in-vehicle backup power supply according to a third disclosure, similar effects to the first disclosure and the second disclosure can be obtained.

In this manner, the in-vehicle backup power supply control device according to the first disclosure and the second disclosure, and the in-vehicle backup power supply according to the third disclosure can favorably make a notification indicating the state of a power storage unit to an external device while suppressing cost and size.

Figure 1:
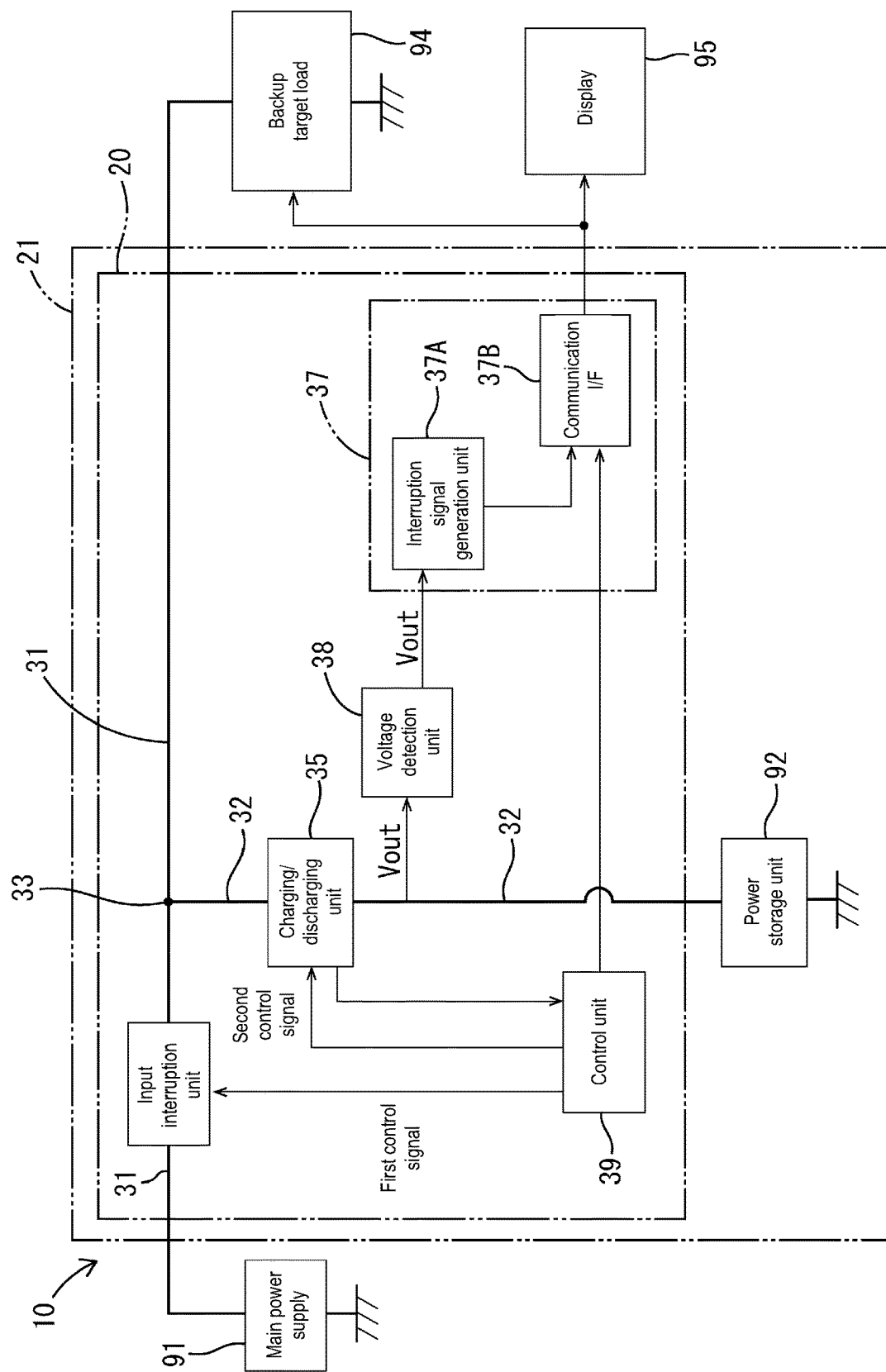
FIG. 1 is a circuit diagram illustrating an in-vehicle backup power supply control device according to a first working example.

DESCRIPTION OF PREFERRED
EMBODIMENTS

Here, a favorable example of the present disclosure will be described. However, the present disclosure is not limited to the following example.

The current detection unit of the in-vehicle backup power supply control device of the second disclosure may detect a charging current value of the current flowing into the power storage unit when the charging/discharging unit charges the power storage unit. If the charging current value detected by the current detection unit is a current threshold or more, the signal interruption unit may permit the control device to output a predetermined signal to an external device.

With this configuration, in the case where the charging current is large to some extent (i.e., when the charging voltage is highly likely to increase thereafter), the signal interruption unit permits a predetermined signal to be output, and this case can be treated similarly to the case where the charging current is large.

Specifically, for example, the signal interruption unit may operate to permit the control device to output a predetermined signal to the external device in the case where the charging voltage is at least a second voltage threshold that is lower than the predetermined threshold (specifically, a voltage threshold that is lower than the predetermined threshold and greater than 0) and the charging current value is at least the current threshold. By doing so, in the case where the charging voltage has not reached the predetermined threshold but is highly likely to increase to the second voltage threshold or more, the control device can be permitted to output a predetermined signal to the external device. Therefore, while achieving the effect of the second disclosure, in the case where it has been guaranteed that the charging voltage is highly likely to increase to exceed a certain level, a situation in which the output of a predetermined signal is excessively restricted can be suppressed. In this case, when the charging voltage is less than the second voltage threshold, even if the charging current value is the current threshold or more, the signal interruption unit may operate to interrupt the output of a predetermined signal by the control device to the external device.

Alternatively, when the charging voltage is lower than the predetermined threshold, if the charging current value is at least the current threshold, the signal interruption unit may operate to permit the output of a predetermined signal by the control device to the external device regardless of the specific value of the charging voltage. With this configuration as well, while achieving the effect of the second disclosure, in the case where it is expected that the charging voltage will increase, a situation in which the output of a predetermined signal is excessively restricted can be suppressed.

The current detection unit of the in-vehicle backup power supply control device of the second disclosure may detect a discharge current value of a current flowing from the power storage unit when the charging/discharging unit discharges the power storage unit. If the discharge current value detected by the current detection unit is the current threshold or more, the signal interruption unit may permit the output of a predetermined signal by the control device to the external device.

With this configuration, in the case where the discharge current is large to some extent, the signal interruption unit can permit the output of a predetermined signal, and this case can be treated similarly to the case where the charging current is large.

Specifically, for example, in the case where the charging voltage is at least a second voltage threshold that is lower than the predetermined threshold (specifically, a voltage threshold that is lower than the predetermined threshold and greater than 0) and the discharge current value is at least the current threshold, the signal interruption unit may operate to permit the output of a predetermined signal by the control device to the external device. In this case, when the charging voltage is less than the second voltage threshold, even if the discharge current value is the current threshold or more, the signal interruption unit may operate to interrupt the output of the predetermined signal by the control device to the external device.

Alternatively, in the case where the charging voltage is lower than the predetermined threshold, if the discharge current value is the current threshold or more, the signal interruption unit may operate to permit the output of a predetermined signal by the control device to the external device regardless of a specific value of the charging voltage.

A configuration is also possible in which, in the signal interruption unit of the in-vehicle backup power supply control device of the first disclosure and the second disclosure, the control unit outputs, to the external device, a signal indicating that the control unit is in a normal state, as a predetermined signal.

With this configuration, in the case where a signal indicating that the control unit is in the normal state is output, the fact that the charging state of the power storage unit is good can be grasped by the device external to the control device, and in the case where the signal indicating that the control unit is in the normal state is not output, the fact that the charging state of the power storage unit is not good can be grasped by the device external to the control device.

The signal interruption unit of the in-vehicle backup power supply control device according to the first disclosure and the second disclosure may determine the state of the power storage unit separately from the control unit.

With this configuration, even in the case where the control unit does not function, the state of charging of the power storage unit can be determined by the signal interruption unit.

Hereinafter, the first and second working examples in which the present disclosure is embodied will be described.

First Working Example

First, a configuration relating to an in-vehicle backup power supply control device 20 (hereinafter also referred to as a control device 20) and a backup power supply 21 will be described.

The in-vehicle system 10 shown in FIG. 1 is constituted as an in-vehicle power supply system, and includes a main power supply 91, a backup target load 94, a display 95, a power storage unit 92, the control device 20, and the like. The backup power supply 21 includes the control device 20 and the power storage unit 92.

The in-vehicle system 10 is configured such that a voltage can be applied from the main power supply 91 to the backup target load 94, and further, a voltage can be applied from the main power supply 91 to the power storage unit 92 as well. Further, the in-vehicle system 10 is configured such that a voltage can be applied from the power storage unit 92 to the backup target load 94 at a predetermined time (e.g., when the main power supply 91 has failed).

The main power supply 91 is a DC power supply that generates a DC voltage, and a known power supply means such as a lead battery, a LiB, an alternator, or a converter is used. The main power supply 91 is provided with a high-potential terminal and a low-potential terminal, the high-potential terminal being electrically connected to a first conductive path 31, and the low-potential terminal being electrically connected to a ground, for example. The main power supply 91 is configured to apply a predetermined output voltage to the first conductive path 31. Note that a power generator (not shown) is electrically connected to the first conductive path 31, and the main power supply 91 can be charged with power generated by the power generator.

The backup target load 94 is a known in-vehicle electronic component, and a product that requires temporal power supply from the backup power supply 21 when the main power supply 91 fails, such as an electromotive component, an ECU, an ADAS target component or the like can be applied. The backup target load 94 is electrically connected to the first conductive path 31.

The display 95 is, for example, a component such as a meter or indicator, and constituted by a device that can notify a user of the state of the control device 20. Upon receiving the input of a signal indicating that a later-described control unit 39 is in a normal state via a later-described communication I/F 37B (hereinafter also referred to as a "communication interface 37B"), the display 95 displays an indication to notify the user that the control unit 39 is in the normal state.

The power storage unit 92 is a DC power supply that outputs a DC voltage, and is constituted by, for example, components that can store power such as an EDLC, an LiC, a capacitor, a lead battery, or a LiB. One terminal (high-potential terminal) of the power storage unit 92 is electrically connected to the second conductive path 32, with a predetermined output voltage being applied thereto, and another terminal (low-potential terminal) is electrically connected to the ground, and kept at a predetermined potential (e.g., 0V). The power storage unit 92 is charged by being supplied with a charging current from the main power supply 91 via the first conductive path 31 and the second conductive path 32 when an input interruption unit 34 performs a permitting operation and a charging/discharging unit 35 performs a charging operation.

The power storage unit 92 can function as a power supply for backing up the main power supply 91. For example, even in the situation where the first conductive path 31 enters a non-conductive state and a voltage is not applied to the backup target load 94 from the main power supply 91 when the input interruption unit 34 is performing a prohibiting operation, if the charging/discharging unit 35 is performing a discharging operation, a voltage can be applied from the power storage unit 92 to the backup target load 94, and a load current can be allowed to flow to the backup target load 94.

The control device 20 includes the first conductive path 31, the input interruption unit 34, the second conductive path 32, the charging/discharging unit 35, a voltage detection unit 38, the control unit 39, and a signal interruption unit 37.

The first conductive path 31 is a conductive path serving as a path for power between the main power supply 91 and the backup target load 94, and is electrically connected to the main power supply 91 and the backup target load 94.

The input interruption unit 34 is provided between the main power supply 91 and a connection unit 33 at which the first conductive path 31 and the second conductive path 32 are connected, and has a function of switching the connection between the main power supply 91 and the connection unit 33 between a non-conductive state in which a bidirectional current flow is interrupted, and a conductive state in which a current can flow (electrically connected).

The input interruption unit 34 may be constituted by components that can interrupt a circuit connection, such as an FET, a transistor, or a relay, and a circuit and components that can detect a potential difference such as a voltage shortage and generate a control signal as necessary. The input interruption unit 34 is controlled by a first control signal supplied from the later-described control unit 39. Specifically, the input interruption unit 34 performs the permitting operation in response to being supplied with the first control signal serving as a permitting signal from the control unit 39, and brings the first conductive path 31 into the conductive state. The input interruption unit 34 performs the prohibiting operation in response to being supplied with the first control signal serving as a prohibiting signal from the control unit 39, and brings the first conductive path 31 into the non-conductive state.

The input interruption unit 34 switches the first conductive path 31 to the conductive state by performing the permitting operation, and in this manner, a voltage can be applied from the main power supply 91 to the backup target load 94 via the first conductive path 31. The first conductive path 31 functions as a current path when a load current is allowed to flow from the main power supply 91 to the backup target load 94. Further, upon switching the first conductive path 31 to the non-conductive state by performing the prohibiting operation, the input interruption unit 34 stops application of the voltage from the main power supply 91 to the backup target load 94.

The second conductive path 32 is electrically connected to the first conductive path 31 and the power storage unit 92. The second conductive path 32 functions as a current path when a charging current is allowed to flow from the main power supply 91 to the power storage unit 92, and also functions as a current path when a discharge current is allowed to flow from the power storage unit 92 to the backup target load 94.

The charging/discharging unit 35 is constituted by, for example, a circuit and components such as a converter, a resistor, an FET, a diode, with which the power storage unit 92 can be charged and discharged. More specifically, the charging/discharging unit 35 is configured as a known voltage conversion circuit such as a step-up/down DC-DC converter. The charging/discharging unit 35 is interposed between the main power supply 91 and the power storage unit 92, and functions as a charging unit for charging the power storage unit 92 using power supplied from the main power supply 91. Also, the charging/discharging unit 35 is interposed between the power storage unit 92 and the backup target load 94, and functions as a discharging unit for discharging the power storage unit 92 to supply power to the backup target load 94.

The charging/discharging unit 35 is controlled, by the control unit 39, to perform the charging operation for charging the power storage unit 92 using power from the main power supply 91, a charge stop operation for stopping the charging of the power storage unit 92, the discharging operation for discharging the power storage unit 92, and a discharge stop operation for stopping the discharging of the power storage unit 92. The charging/discharging unit 35 is configured to be controlled by a second control signal supplied from the control unit 39, performs the charging operation in response to being supplied with a second control signal serving as a charging signal, performs the charge stop operation in response to being supplied with a second control signal serving as a charging stop signal, performs the discharging operation in response to being supplied with a second control signal serving as a discharging signal, and performs the discharge stop operation in response to being supplied with a second control signal serving as a discharging stop signal.

When supplied with the second control signal serving as the charging signal, the charging/discharging unit 35 performs a voltage conversion operation to step down a power supply voltage input from the main power supply 91 via the first conductive path 31 and the input interruption unit 34, and applies the thus stepped-down voltage to the power storage unit 92 via the second conductive path 32. When supplied with the second control signal serving as the charging stop signal, the charging/discharging unit 35 stops the above-described charging operation and brings the second conductive path 32 into the non-conductive state. When supplied with the second control signal serving as the discharging signal, the charging/discharging unit 35 performs the discharging operation to output a determined target voltage to the first conductive path 31, based on an input voltage (output voltage from the power storage unit 92) applied to the second conductive path 32. When supplied with the second control signal serving as the discharging stop signal, the charging/discharging unit 35 stops the above-described discharging operation and brings the second conductive path 32 into the non-conductive state.

The voltage detection unit 38 is configured to output a value that can specify a voltage value Vout at a position between the charging/discharging unit 35 and the power storage unit 92 on the second conductive path 32 (specifically, a voltage value corresponding to the magnitude of the voltage at this position). That is to say, the voltage detection unit 38 detects the voltage of the power storage unit 92. The voltage detection unit 38 is constituted by, for example, a circuit and components for detecting a voltage and converting the voltage to any voltage level and outputs the voltage value Vout itself at the position between the charging/discharging unit 35 and the power storage unit 92, or a value obtained by dividing the voltage value Vout using a voltage dividing circuit, as a detected value (a value that can specify the voltage value Vout).

The control unit 39 is constituted by a circuit, components that can perform control such as a microcomputer, an FPGA, or the like. The control unit 39 can cause the input interruption unit 34 to perform either operation of the permitting operation or the prohibiting operation by supplying a first control signal to the input interruption unit 34. The control unit 39 can cause the charging/discharging unit 35 to perform any operation of the charging operation, the charge stop operation, the discharging operation, or the discharge stop operation by supplying the second control signal to the charging/discharging unit 35. The control unit 39 can make a notification by transmitting a signal indicating that the control unit 39 is in the normal state to an external device via a later-described communication interface 37B.

The signal interruption unit 37 includes an interruption signal generation unit 37A and the communication interface 37B.

The interruption signal generation unit 37A is constituted by a circuit and components that can generate an interruption signal for controlling the communication interface 37B based on the voltage value Vout of the power storage unit 92 (hereinafter also referred to as a "voltage value Vout") detected by the voltage detection unit 38, for example. If the voltage value Vout is smaller than a predetermined first threshold Th1 (predetermined threshold), the interruption signal generation unit 37A generates the interruption signal, and if the voltage value Vout is the predetermined first threshold Th1 or more, the interruption signal generation unit 37A does not generate the interruption signal. The interruption signal turns to a low level L or a high level H, and at the low level L, the interruption signal is generated, and at the high level H, no interruption signal is generated.

The communication interface 37B is constituted by a circuit and components that can output a communication signal, for example. The communication interface 37B is configured to be able to transmit a signal indicating that the control unit 39 is in the normal state to the external device. Upon receiving the input of the generated interruption signal (i.e., low level L), the communication interface 37B interrupts transmission of the signal indicating the that the control unit 39 is in the normal state to the external device, and if the interruption signal is not generated (i.e., high level H), the communication interface 37B does not interrupt transmission of the signal indicating that the control unit 39 is in the normal state to the external device.

Next, the operation of the control device 20 will be described.

In the normal state, the control device 20 applies a voltage to the backup target load 94 from the main power supply 91.

In an abnormal state where the main power supply 91 cannot be used, the control device 20 applies a voltage from the power storage unit 92 serving as the backup of the main power supply 91 to the backup target load 94. Hereinafter, the operation of the control device 20 will be described in detail.

When the control unit 39 is in the normal state, the control unit 39 outputs the second control signal serving as the charging signal to the charging/discharging unit 35. By doing so, the control unit 39 controls the charging/discharging unit 35 to perform the charging operation. In this manner, the control device 20 charges the power storage unit 92. The charging of the power storage unit 92 progresses and the voltage of the power storage unit 92 increases. When the voltage of the power storage unit 92 has reached a voltage at which it is determined that power to be stored when a backup operation is required due to a failure of the main power supply 91 or the like has been stored (has reached the predetermined first threshold Th1 or more), the control unit 39 outputs the second control signal serving as the charging stop signal to the charging/discharging unit 35 to control the charging/discharging unit 35 to perform the charge stop operation. Then, the control unit 39 communicates with the backup target load 94 or the display 95, and outputs a signal indicating that the control unit 39 is in the normal state to make a notification indicating that the control unit 39 is in the normal state, and notifies a user of the fact that the power storage unit 92 can operate normally.

Further, if the control unit 39 is not in the normal state and has ended the charging of the power storage unit 92 despite the fact that the power storage unit 92 has not been charged to reach an envisioned voltage (a voltage at which it is determined that power to be stored when the backup operation is required has been stored (the predetermined first threshold Th1)), the control unit 39 notifies the user of the fact that the power storage unit 92 cannot backup the main power supply 91, by interrupting communication with the backup target load 94 or the display 95 using the signal interruption unit 37. At this time, the signal interruption unit 37 interrupts the output of the signal from the control unit 39 to the external device, regardless of whether or not the control unit 39 is outputting the signal indicating that the control unit 39 is in the normal state.

Also, in the case where power stored in the power storage unit 92 is discharged for some reason, and the voltage of the power storage unit 92 falls below the voltage at which it is determined that power to be stored when a backup operation is required due to a failure of the main power supply 91 or the like has been stored (smaller than the predetermined first threshold Th1), the signal interruption unit 37 interrupts connection between the control unit 39 and the backup target load 94 or the display 95 such that the signal indicating that the control unit 39 is in the normal state is not output, and notifies the user of the fact that the power storage unit 92 cannot backup the main power supply 91.

In this configuration, when an ignition switch (not shown) provided in the vehicle in which the control device 20 is mounted is in an off state, an IG off signal indicating that the ignition switch is in the off state is input from the external ECU to the control unit 39, and if the ignition switch is in an on state, an IG on signal indicating that the ignition switch is in the on state is input from the external ECU to the control unit 39.

When the vehicle operation is stopped (when the ignition switch is turned off), for example, the first control signal serving as the prohibiting signal is input from the control unit 39 to the input interruption unit 34, the second control signal serving as the charging stop signal is input to the charging/discharging unit 35, the input interruption unit 34 performs the prohibiting operation, and the charging/discharging unit 35 performs the charge stop operation, thereby keeping the first conductive path 31 and the second conductive path 32 in the non-conductive state.

If the ignition switch is turned to the on state from the off state, the control unit 39 outputs the first control signal serving as the permitting signal to the input interruption unit 34. In response to the first control signal being output in this way, the input interruption unit 34 performs the permitting operation for switching the first conductive path 31 to the conductive state from the non-conductive state, and when the input interruption unit 34 brings the first conductive path 31 into the conductive state, a current is supplied from the main power supply 91 to the backup target load 94.

The control unit 39 is configured to be capable of monitoring the operation state of the input interruption unit 34 and the charging/discharging unit 35, based on the state of the current and voltage of the input interruption unit 34 and the charging/discharging unit 35, and can determine operation of the input interruption unit 34 and the charging/discharging unit 35 according to the state of the current and voltage. Also, the control unit 39 is configured to be capable of determining the state of the power storage unit 92 according to the state of the current and voltage thereof.

Next, an example of the operation performed when the control unit 39 is in the normal state will be described with reference to FIG. 2.

Figure 2:
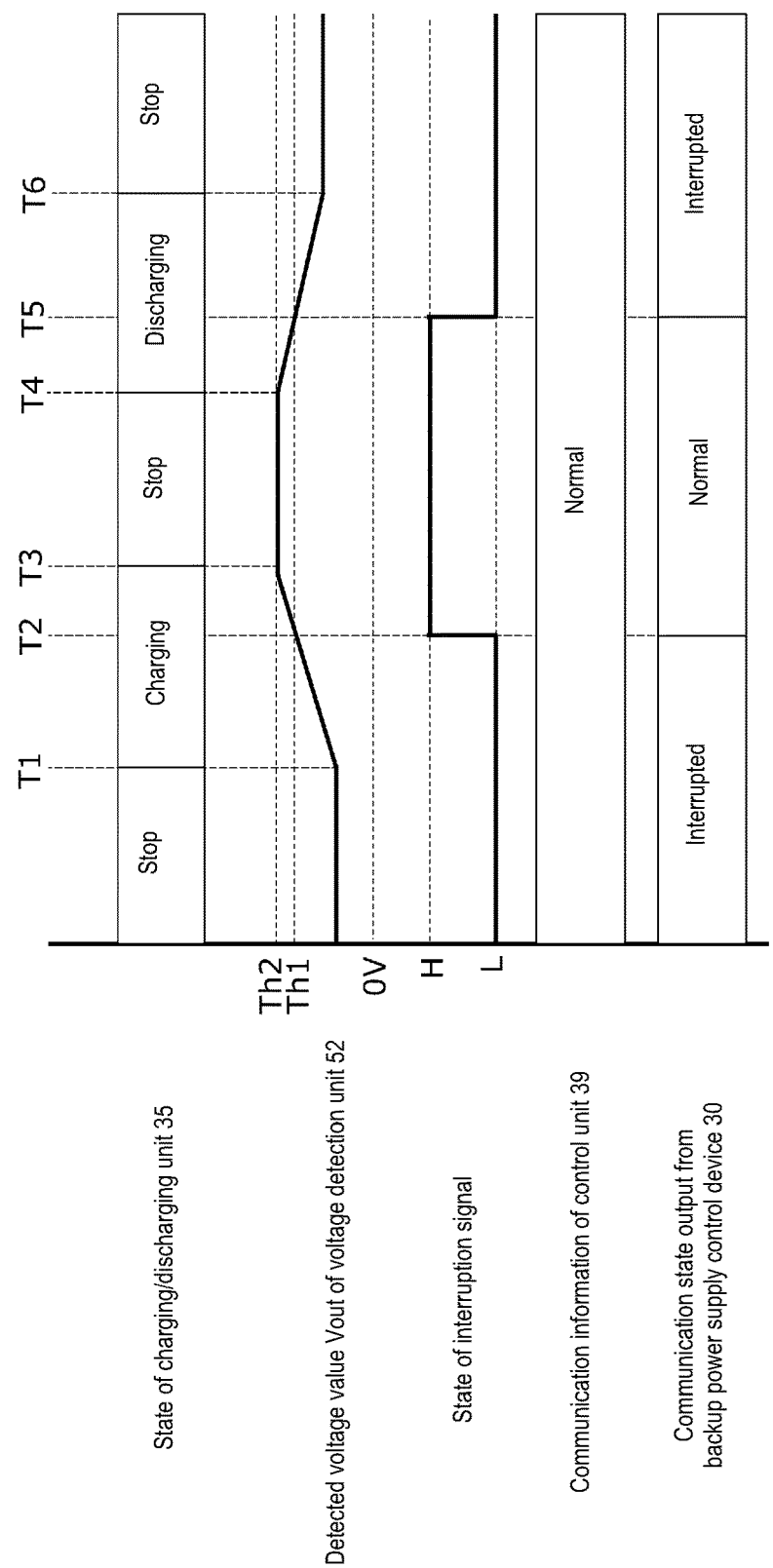
FIG. 2 is a timing chart showing detected voltage values of a voltage detection unit, the state of interruption signals, communication information of a control unit, and the state of communication output by the in-vehicle backup power supply control device, when the control unit of the in-vehicle backup power supply control device according to the first working example is in a normal state.

In the example of FIG. 2, the time slot before (in the figure, left side of) a time T1 is the time slot in which the ignition switch is in the off state, for example. At this time, the voltage value Vout is smaller than a predetermined first threshold Th1. The interruption signal is generated (i.e., at the low level L) in this state. Accordingly, the communication interface 37B makes an interruption such that the signal indicating that the control unit 39 is in the normal state is not output to the external device.

At the time T1, for example, the ignition switch turns to the on state from the off state, the control unit 39 detects the change over, and outputs the first control signal serving as the permitting signal, and thereby controls the input interruption unit 34 to perform the permitting operation to bring the first conductive path 31 into the conductive state. The control unit 39 also outputs the second control signal serving as the charging signal, and thereby controls the charging/discharging unit 35 to perform the charging operation and applies a voltage from the main power supply 91 to the backup target load 94, and also applies a voltage from the main power supply 91 to the power storage unit 92, and starts to charge the power storage unit 92. By doing so, the voltage value Vout gradually increases. That is, the charging/discharging unit 35 charges the power storage unit 92.

A time T2 indicates the state where the voltage value Vout has reached a predetermined first threshold Th1 or more. At this time, based on the fact that the voltage value Vout is a predetermined first threshold Th1 or more, the interruption signal generation unit 37A of the signal interruption unit 37 switches the interruption signal to the high level H from the low level L such that no interruption signal is generated. By doing so, the signal indicating that the control unit 39 is in the normal state is transmitted to the external device without being interrupted by the communication interface 37B.

At a time T3, based on the fact that the voltage value Vout is the predetermined first threshold Th1 or more and has reached a predetermined second threshold Th2, the control unit 39 outputs the second control signal serving as the charging stop signal to control the charging/discharging unit 35 to perform the charge stop operation, brings the second conductive path 32 into the non-conductive state, and thereby stops the charging of the power storage unit 92.

At a time T4, for example, based on the fact that the main power supply 91 has failed, the control unit 39 outputs the first control signal serving as the prohibiting signal to control the input interruption unit 34 to perform the prohibiting operation and brings the first conductive path 31 into the non-conductive state. The control unit 39 also outputs the second control signal serving as the discharging signal to control the charging/discharging unit 35 to perform the discharging operation, applies a voltage from the power storage unit 92 to the backup target load 94, and allows a load current to flow to the backup target load 94. In this manner, the voltage value Vout gradually decreases.

A time T5 indicates the state where the voltage value Vout has fallen below the predetermined first threshold Th1. At this time, based on the fact that the voltage value Vout has fallen below the predetermined first threshold Th1, the interruption signal generation unit 37A of the signal interruption unit 37 switches the interruption signal to the low level L from the high level H such that the interruption signal is generated. By doing so, the communication interface 37B makes an interruption such that the signal indicating that the control unit 39 is in the normal state is not transmitted to the external device.

At a time T6, for example, when the voltage value Vout has fallen below the predetermined first threshold Th1 by a predetermined amount, the control unit 39 outputs the second control signal serving as the discharging stop signal to control the charging/discharging unit 35 to perform the discharge stop operation, brings the second conductive path 32 into the non-conductive state, and thus the control unit 39 stops application of the voltage from the power storage unit 92 to the backup target load 94.

Next, an example of the operation performed when the control unit 39 is not in the normal state will be described with reference to FIG. 3. The wording "the control unit 39 is not in the normal state" means a state where the control unit 39 mistakenly determines that the voltage of the power storage unit 92 is higher than the actual voltage, and the like. In this case, even when the voltage value Vout is smaller than the predetermined first threshold Th1 (i.e., in the state where the power storage unit 92 cannot function as a power supply for backing up the main power supply 91), the control unit 39 makes a wrong determination that the power storage unit 92 can function as a power supply for backing up the main power supply 91. Note that, in this state, the control unit 39 outputs the signal indicating that the control unit 39 is in the normal state.

Figure 3:
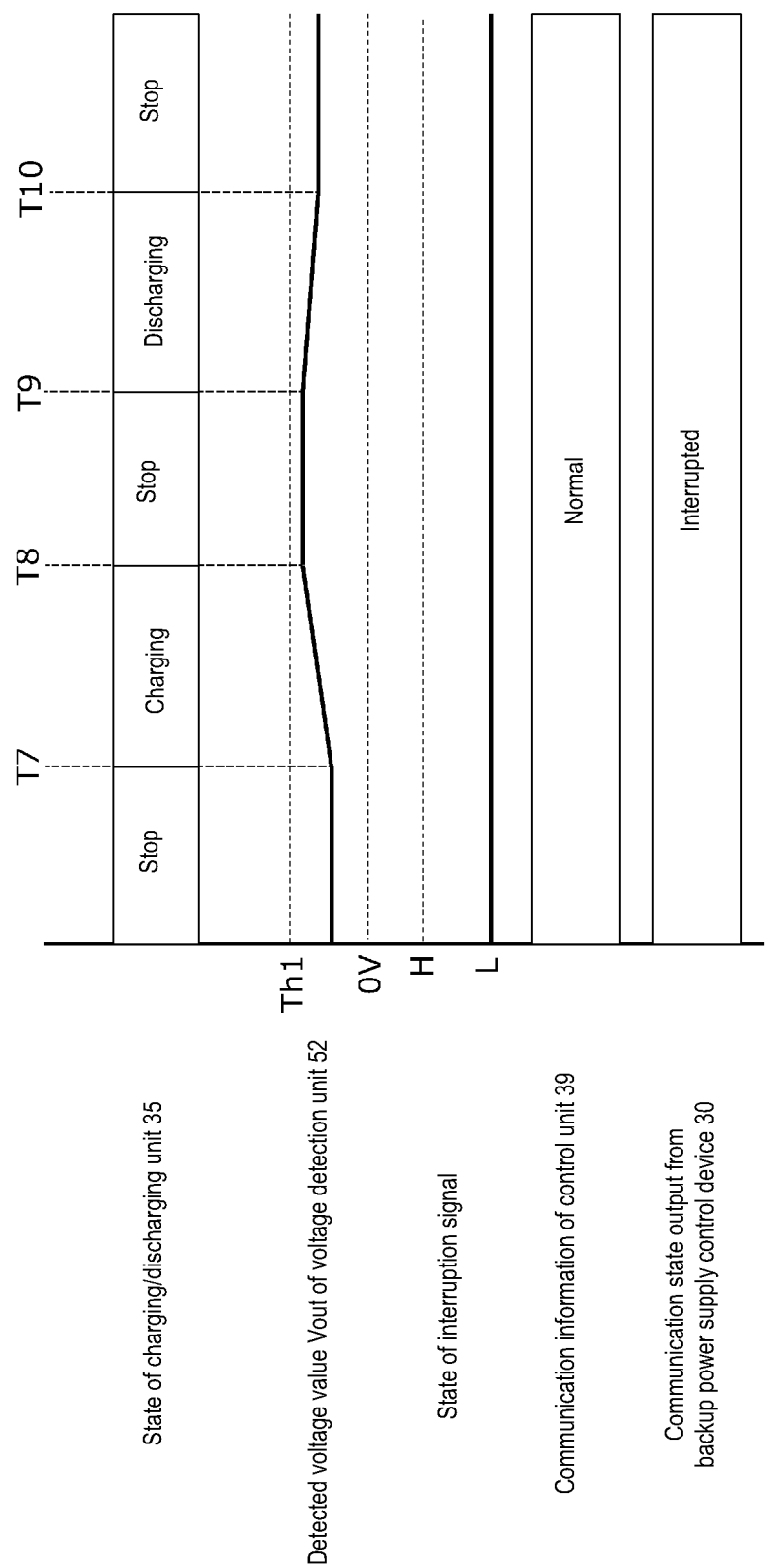
FIG. 3 is a timing chart showing the detected voltage values of the voltage detection unit, the state of the interruption signals, the communication information of the control unit, and the state of communication output by the in-vehicle backup power supply control device, when the control unit of the in-vehicle backup power supply control device according to the first working example is not in the normal state.

In the example of FIG. 3, the time slot before (in the figure, left side of) the time T7 shows the same state as the time slot before the time T1 in FIG. 2, and is a time slot in which the ignition switch is in the off state. At this time, the voltage value Vout is smaller than the predetermined first threshold Th1. The interruption signal is generated (i.e., at the low level L) in this state. In this manner, the communication interface 37B makes an interruption such that the signal indicating that the control unit 39 is in the normal state is not transmitted to the external device.

At a time T7, for example, the ignition switch turns to the on state from the off state, the control unit 39 detects the change over, and outputs the first control signal serving as the permitting signal to control the input interruption unit 34 to perform the permitting operation, and brings the first conductive path 31 into the conductive state. The control unit 39 also outputs the second control signal serving as the charging signal to control the charging/discharging unit 35 to perform a charging operation, applies a voltage from the main power supply 91 to the backup target load 94, and also applies a voltage from the main power supply 91 to the power storage unit 92, and starts to charge the power storage unit 92. By doing so, the voltage value Vout gradually increases.

At a time T8, even when the voltage value Vout is smaller than the predetermined first threshold Th1 (i.e., in the state where the power storage unit 92 cannot function as a power supply for backing up the main power supply 91), the control unit 39 that is not in the normal state makes a wrong determination that the power storage unit 92 can function as a power supply for backing up the main power supply 91. By doing so, although the voltage value Vout has not reached the second threshold Th2, the control unit 39 outputs the second control signal serving as the charging stop signal to control the charging/discharging unit 35 to perform the charge stop operation, brings the second conductive path 32 into the non-conductive state, and thereby stops the charging of the power storage unit 92.

At this time, since the voltage value Vout is smaller than the predetermined first threshold Th1, the interruption signal generation unit 37A of the signal interruption unit 37 maintains the state where the interruption signal is generated (i.e., low level L).

At a time T9, for example, based on the fact that the control unit 39 detects that the main power supply 91 has failed, the control unit 39 that is not in the normal state outputs the first control signal serving as the prohibiting signal to control the input interruption unit 34 to perform the prohibiting operation, and brings the first conductive path 31 into the non-conductive state. The control unit 39 also outputs the second control signal serving as the discharging signal to control the charging/discharging unit 35 to perform the discharging operation, applies a voltage to the backup target load 94 from the power storage unit 92, and allows the load current to flow to the backup target load 94. By doing so, the voltage value Vout gradually decreases.

At a time T10, for example, when the voltage value Vout has fallen below the predetermined first threshold Th1 by a predetermined amount, the control unit 39 that is not in the normal state outputs the second control signal serving as the discharging stop signal to control the charging/discharging unit 35 to perform the discharge stop operation, brings the second conductive path 32 into the non-conductive state, and thereby stops application of the voltage from the power storage unit 92 to the backup target load 94.

In FIG. 3, the interruption signal is generated (i.e., at the low level L) for the entire time period. In this manner, even when the control unit 39 is not in the normal state, the communication interface 37B makes a notification, to the external device, indicating that the power storage unit 92 cannot function as a power supply for backing up the main power supply 91, by interrupting communication from the control unit 39 to the external device. That is, the signal interruption unit 37 determines the state of the power storage unit 92 separately from the control unit 39.

Hereinafter, the effects of this configuration will be illustrated.

According to the control device 20 with this configuration, in the case where the voltage value Vout of the power storage unit 92 detected by the voltage detection unit 38 is smaller than a predetermined first threshold Th1, the signal interruption unit 38 interrupts the signal output from the control unit 39 to the external device, and in the case where the voltage value Vout of the power storage unit 92 detected by the voltage detection unit 38 is the predetermined first threshold Th1 or more, the signal interruption unit 37 does not interrupt the signal output from the control unit 39 to the external device.

That is, since the control device 20 can notify the external device of the state of the power storage unit 92 by interrupting the signal output to the external device from the control unit 39, a notification indicating the state of the power storage unit 92 can be made to the external device without newly providing a communication line, a communication port, and the like for transmitting a signal indicating the state of the power storage unit 92 to the external device.

According to the backup power supply 21 with this configuration, the specifications of the charging/discharging unit 35, the voltage detection unit 38, the control unit 39, and the signal interruption unit 37 can be made suitable to the specification of the power storage unit 92, and thus the performance of the backup power supply 21 can be further improved.

Accordingly, the control device 20 with this configuration and the backup power supply 21 with this configuration can favorably make a notification indicating the state of the power storage unit 92 to the external device while suppressing cost and size.

The signal interruption unit 37 of the control device 20 with this configuration generates the interruption signal for interrupting a notification indicating that the control unit 39 is in the normal state to the external device.

With this configuration, by interrupting the notification indicating that the control unit 39 is in the normal state to the external device using the interruption signal, a notification indicating that the power storage unit 92 cannot function as a power supply for backing up the main power supply 91 is made to the external device. The fact that the power storage unit 92 cannot function as a power supply for backing up the main power supply 91 is more important than the fact that the control unit 39 is in the normal state. That is, a notification regarding important information can be preferentially made to the external device by interrupting the notification indicating that the control unit 39 is in the normal state to the external device.

The signal interruption unit 37 of the control device 20 with this configuration determines the state of the power storage unit 92 separately from the control unit 39.

With this configuration, even in the case where the control unit 39 does not function, the charging state of the power storage unit 92 can be determined by the signal interruption unit 37.

Second Working Example

Figure 4:
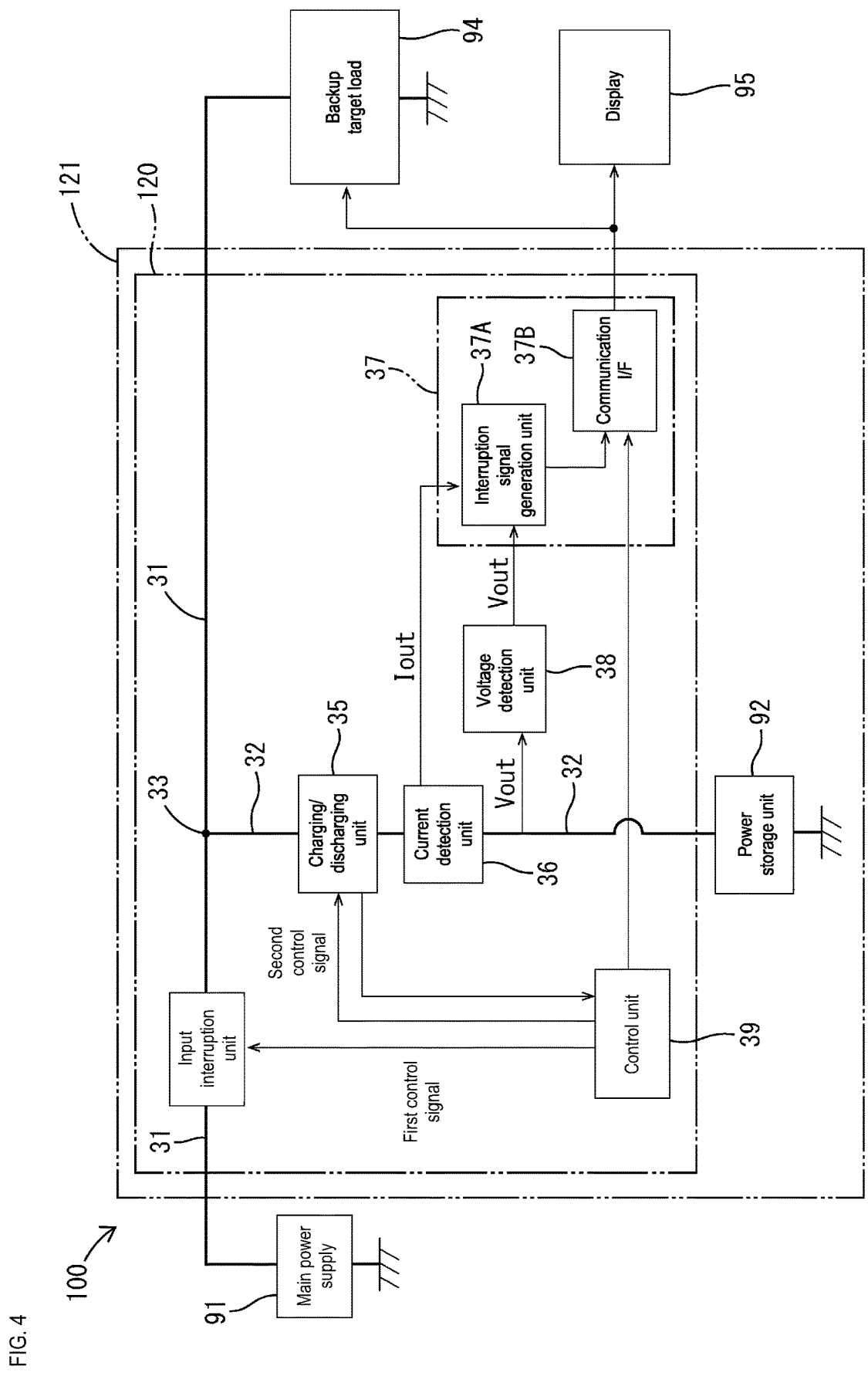
FIG. 4 is a circuit diagram illustrating an in-vehicle backup power supply control device according to a second working example.

An in-vehicle system 100 using a control device 120 according to a second working example is shown in FIG. 4. The in-vehicle system 100, the control device 120, and a backup power supply 121 have a different the circuit configuration from the in-vehicle system 10, the control device 20, and the backup power supply 21 of the first working example in that a current detection unit 36 is provided between the power storage unit 92 and the charging/discharging unit 35 on the second conductive path 32, but otherwise the circuit configuration is the same as the first working example. Accordingly, with regard to the in-vehicle system 100, the control device 120, and the backup power supply 121 in the second working example, the components constituting the same configuration as the first working example are given the same reference numerals as in the first working example, and a detailed description will be omitted.

The control device 120 and the backup power supply 121 of the second working example respectively include all functions of the control device 20 and the backup power supply 21 of the first working example, and can perform all control described above in the description of the first working example.

The current detection unit 36 is provided at a position between the charging/discharging unit 35 and the power storage unit 92 on the second conductive path 32. The current detection unit 36 is configured as a known current detection circuit, and is configured to output a value that can specify the current value of the current flowing through the second conductive path 32 (specifically, a current value corresponding to the magnitude of the current flowing through the second conductive path 32). The current detection unit 36 is constituted by a circuit and components for detecting the current flowing through the second conductive path 32, and converting the detected current to any voltage level, for example. That is, the current detection unit 36 detects the current flowing through the second conductive path 32 toward the power storage unit 92 when the power storage unit 92 is charged, or the current flowing through the second conductive path 32 from the power storage unit 92 when the power storage unit 92 is discharged.

The interruption signal generation unit 37A is constituted by, for example, a circuit and components that can generate an interruption signal for controlling the communication interface 37B based on the voltage value Vout and a value Tout (hereinafter also referred to as a "current value Tout") that can specify the current value of the current flowing through the second conductive path 32 detected by the current detection unit 36. When the voltage value Vout is smaller than a predetermined first threshold Th1 and the current value Tout is within a predetermined range Ra, the interruption signal generation unit 37A generates the interruption signal, and when the voltage value Vout is smaller than the predetermined first threshold Th1 and the current value Tout is out of the predetermined range Ra, does not generate the interruption signal (see FIG. 5).

Next, the operation of the control device 120 will be described.

In the normal state, the control device 120 uses the main power supply 91. When the operation of the vehicle is stopped (when the ignition switch is turned off), the first control signal serving as the prohibiting signal is input from the control unit 39 to the input interruption unit 34, the second control signal serving as the charging stop signal is input to the charging/discharging unit 35, the input interruption unit 34 performs the prohibiting operation, the charging/discharging unit 35 performs the charge stop operation, and thereby the first conductive path 31 and the second conductive path 32 are kept in the non-conductive state. Then, when the ignition switch turns to the on state from the off state, the control unit 39 outputs the first control signal serving as the permitting signal to the input interruption unit 34. Due to the input interruption unit 34 performing the permitting operation in response to the output of the first control signal as above, the first conductive path 31 enters the conductive state, and a current is supplied to the backup target load 94 from the main power supply 91.

The control unit 39 is configured to be capable of monitoring the operation state of the input interruption unit 34 and the charging/discharging unit 35 based on the state of the current and voltage of the input interruption unit 34 and the charging/discharging unit 35, and can determine the operation of the input interruption unit 34 and the charging/discharging unit 35 according to the state of the current and voltage. Also, the control unit 39 is configured to be capable of determining the state of the power storage unit 92 according to the state of the current and voltage.

Next, an example of the operation performed when the control unit 39 is in the normal state will be described with reference to FIG. 5.

Figure 5:
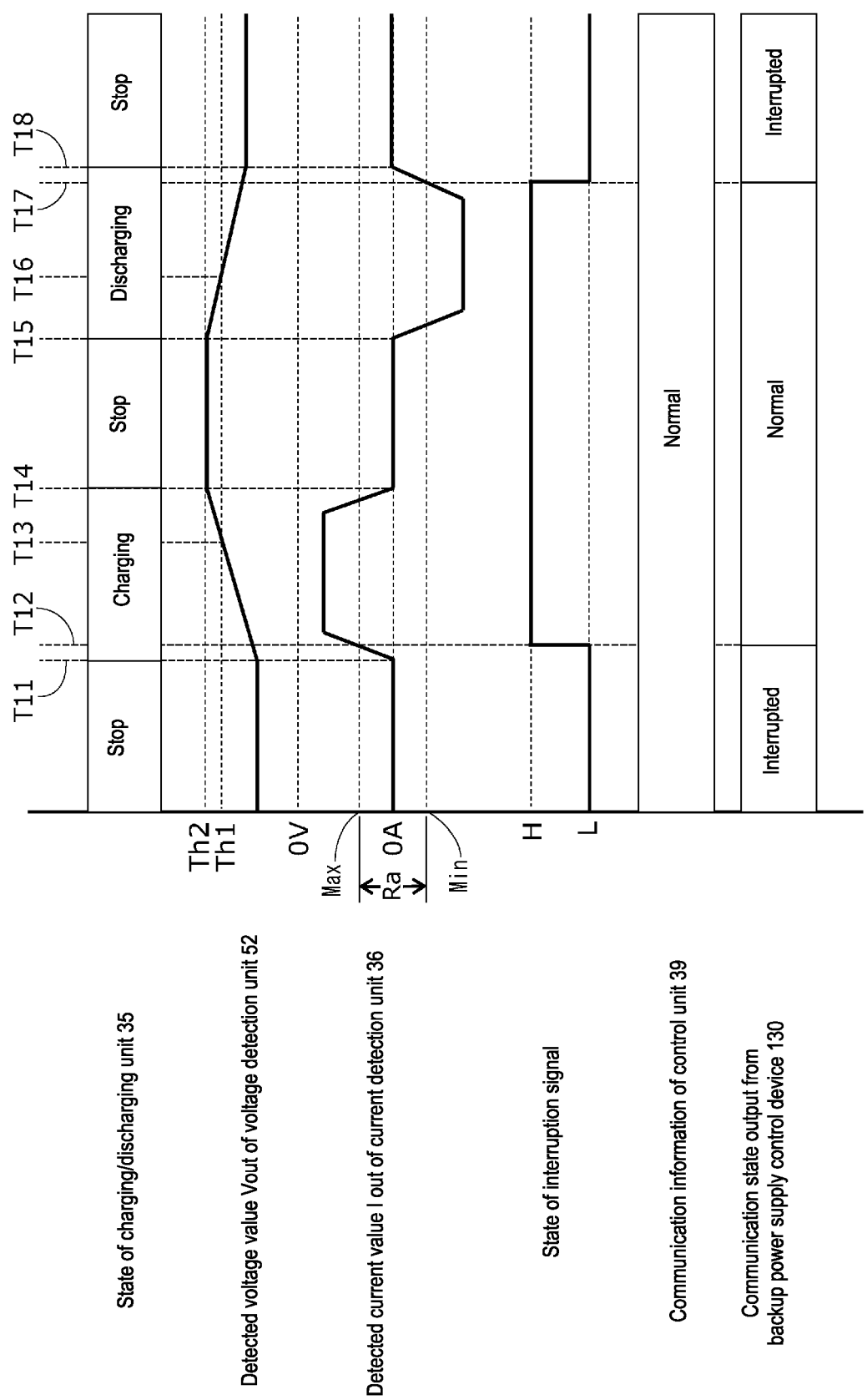
FIG. 5 is a timing chart showing detected voltage values of a voltage detection unit, detected current values of a current detection unit, the state of interruption signals, communication information of a control unit, and the state of communication output by the in-vehicle backup power supply control device, when the control unit of the in-vehicle backup power supply control device according to the second working example is in a normal state.

In the example of FIG. 5, in the time slot before (in the figure, left side of) the time T11, the ignition signal is in the off state and the voltage value Vout is smaller than a predetermined first threshold Th1, for example. Also, the interruption signal is generated (i.e., at the low level L) in this state. In this manner, the communication interface 37B makes an interruption such that the signal indicating that the control unit 39 is in the normal state is not transmitted to the external device. The current value Iout is 0.

At a time T11, the ignition switch turns to the on state from the off state, and the control unit 39 detects the change over, and outputs the first control signal serving as the permitting signal to control the input interruption unit 34 to perform the permitting operation and bring the first conductive path 31 into the conductive state. Also, the control unit 39 outputs the second control signal serving as the charging signal to control the charging/discharging unit 35 to perform a charging operation, applies a voltage from the main power supply 91 to the backup target load 94, and also applies a voltage from the main power supply 91 to the power storage unit 92 to start the charging of the power storage unit 92. In this manner, the voltage value Vout gradually increases, and the current value Tout also increases to reach a predetermined threshold Max (upper limit of a predetermined range Ra) or more. The range Ra is between a predetermined threshold Max in a positive direction (upward with respect to 0 A and a direction in which a current flows toward the power storage unit 92) and a predetermined threshold Min in a negative direction (downward of 0 A and a direction in which a current flows out from the power storage unit 92) with 0 A at the center. For example, the predetermined threshold Max (upper limit of the predetermined range Ra) is 2 A, and the predetermined threshold Min (lower limit of the predetermined range Ra) is −2 A.

A time T12 indicates the state where the current value Tout is at least the predetermined threshold Max (upper limit of a predetermined range Ra) and the voltage value Vout is smaller than the predetermined first threshold Th1. At this time, based on the fact that the voltage value Vout is smaller than the predetermined first threshold Th1 and the current value Tout is at least the predetermined threshold Max (i.e., out of a predetermined range Ra), the interruption signal generation unit 37A of the signal interruption unit 37 enters the state where no interruption signal is generated (i.e., switches the interruption signal to the high level H from the low level L). In this manner, the signal indicating that the control unit 39 is in the normal state is transmitted to the external device without being interrupted by the communication interface 37B.

At a time T13, the voltage value Vout reaches or exceeds a predetermined the first threshold Th1. At this time, the interruption signal generation unit 37A of the signal interruption unit 37 maintains the state where no interruption signal is generated (i.e., high level H).

At a time T14, based on the fact the voltage value Vout is the predetermined first threshold Th1 or more and has reached the predetermined second threshold Th2, the control unit 39 outputs the second control signal serving as the charging stop signal to control the charging/discharging unit 35 to perform the charge stop operation, brings the second conductive path 32 into the non-conductive state, and thereby stops the charging of the power storage unit 92. Also, accompanying the stopping of the charging of the power storage unit 92, the current value Tout becomes 0.

At a time T15, for example, based on the fact that the main power supply 91 has failed, the control unit 39 outputs the first control signal serving as the prohibiting signal to control the input interruption unit 34 to perform the prohibiting operation and brings the first conductive path 31 into the non-conductive state. The control unit 39 also outputs the second control signal serving as the discharging signal to control the charging/discharging unit 35 to perform the discharging operation, applies a voltage from the power storage unit 92 to the backup target load 94, and allows a load current to flow through the backup target load 94. Also, accompanying the load current flowing into the backup target load 94, the current value Tout decreases to the predetermined threshold Min (lower limit of a predetermined range Ra) or less.

T16 indicates the state where the voltage value Vout has decreased to below the predetermined first threshold Th1. At this time, the interruption signal generation unit 37A of the signal interruption unit 37 maintains the state where no interruption signal is generated (i.e., high level H).

T17 indicates the state where the current value Tout is greater than the predetermined threshold Min and smaller than 0 (i.e., within a predetermined range Ra), and the voltage value Vout is smaller than the predetermined first threshold Th1. At this time, based on the fact that the voltage value Vout is smaller than the predetermined first threshold Th1 and the current value Tout is greater than the predetermined threshold Min and smaller than 0 (i.e., within the predetermined range Ra), the interruption signal generation unit 37A of the signal interruption unit 37 enters the state where the interruption signal is generated (i.e., switches the interruption signal to the low level L from the high level H). In this manner, the communication interface 37B makes an interruption such that the signal indicating that the control unit 39 is in the normal state is not transmitted to the external device.

At a time T18, for example, when the voltage value Vout decreases to below the predetermined first threshold Th1 by a predetermined amount, the control unit 39 outputs the second control signal serving as the discharging stop signal to control the charging/discharging unit 35 to perform the discharge stop operation, brings the second conductive path 32 into the non-conductive state, and thereby stops application of the voltage to the backup target load 94 from the power storage unit 92. Also, accompanying the stopping of the application of the voltage to the backup target load 94 from the power storage unit 92, the current value Tout becomes 0. At this time, the interruption signal generation unit 37A of the signal interruption unit 37 maintains the state where the interruption signal is generated (i.e., low level L).

Next, an example of the operation performed when the control unit 39 is not in the normal state will be described with reference to FIG. 6. Note that the signal indicating that the control unit 39 is in the normal state is output in this state.

Figure 6:
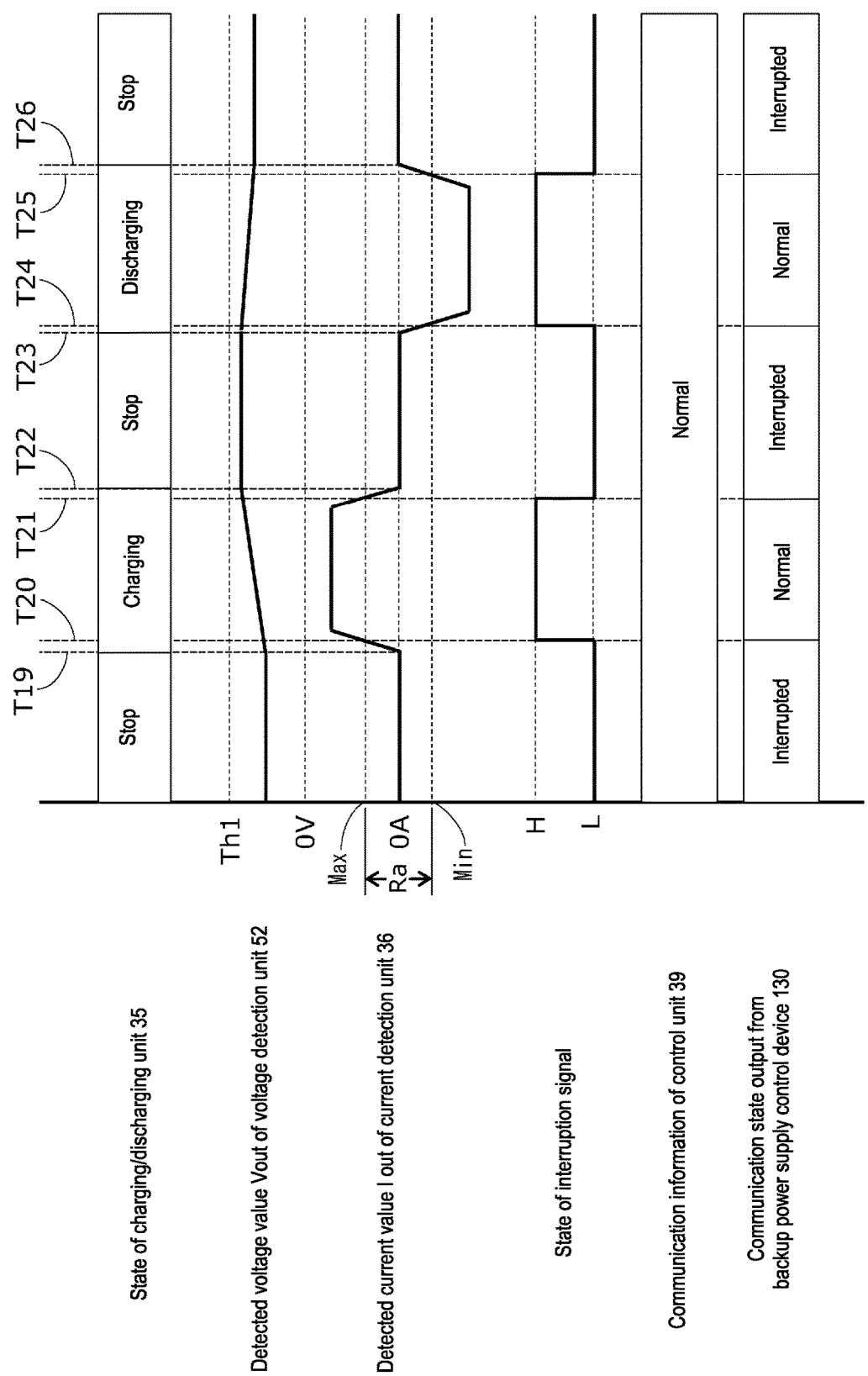
FIG. 6 is a timing chart showing the detected voltage values of the voltage detection unit, the detected current values of the current detection unit, the state of interruption signals, the communication information of the control unit, and the state of communication output by the in-vehicle backup power supply control device, when the control unit of the in-vehicle backup power supply control device according to the second working example is not in the normal state.

In the example of FIG. 6, the time slot before (in the figure, left side of) the time T19 is in the same state as the time slot before the time T11 in FIG. 5.

At a time T19, the ignition switch turns to the on state from the off state, and the control unit 39 detects the change over, and outputs the first control signal serving as the permitting signal to control the input interruption unit 34 to perform the permitting operation, and brings the first conductive path 31 into the conductive state. The control unit 39 also outputs the second control signal serving as the charging signal to control the charging/discharging unit 35 to perform the charging operation, applies a voltage from the main power supply 91 to the backup target load 94, and also applies a voltage from the main power supply 91 to the power storage unit 92, and starts the charging of the power storage unit 92. In this manner, the voltage value Vout gradually increases, and the current value Tout also increases to reach or exceed a predetermined threshold Max (upper limit of the predetermined range Ra).

At a time T20, the current value Tout is at least the predetermined threshold Max (upper limit of the predetermined threshold Ra) and the voltage value Vout is smaller than the predetermined first threshold Th1. At this time, the interruption signal generation unit 37A of the signal interruption unit 37 enters the state where no interruption signal is generated (i.e., switches the interruption signal to the high level H from the low level L), based on the fact that the voltage value Vout is smaller than a predetermined first threshold Th1 and the current value Tout is a predetermined threshold Max or more. In this manner, the signal indicating that the control unit 39 is in the normal state is not interrupted by the communication interface 37B and transmitted to the external device.

A time T21 indicates the state immediately before the control unit 39, which is not in the normal state, controls the charging/discharging unit 35 to perform the charge stop operation despite the voltage value Vout having not reached the predetermined second threshold Th2. At this time, since the control unit 39 is in the state immediately before controlling the charging/discharging unit 35 to perform the charge stop operation, the current flowing toward the power storage unit 92 is gradually decreasing to 0 and the current value Tout has fallen below the predetermined threshold Max (upper limit of the predetermined range Ra).

At this time, based on the fact that the voltage value Vout is smaller than the predetermined first threshold Th1 and the current value Tout is smaller than a predetermined threshold Max and greater than 0 (i.e., within a predetermined range Ra), the interruption signal generation unit 37A of the signal interruption unit 37 enters the state where the interruption signal is generated (i.e., switches the interruption signal to the low level L from the high level H). In this manner, the communication interface 37B makes an interruption such that the signal indicating that the control unit 39 is in the normal state is not transmitted to the external device.

At a time T22, the control unit 39 that is not in the normal state makes a wrong determination that the voltage value Vout has reached the predetermined second threshold Th2 (i.e., in the state where the power storage unit 92 can function as a power supply for backing up the main power supply 91) despite the voltage of the power storage unit 92 being smaller than the predetermined first threshold Th1 (i.e., in the state where the power storage unit 92 cannot function as a power supply for backing up the main power supply 91), and thereby the control unit 39 controls the charging/discharging unit 35 to operate the charge stop operation, brings the second conductive path 32 into the non-conductive state, and thereby stops the charging of the power storage unit 92.

At this time, since the voltage value Vout is smaller than the predetermined first threshold Th1 and the current value Tout is smaller than the predetermined threshold Max and greater than 0, the interruption signal generation unit 37A of the signal interruption unit 37 maintains the state where the interruption signal is generated (i.e., low level L).

At a time T23, for example, based on the fact that the main power supply 91 has failed, the control unit 39 that is not in the normal state outputs the first control signal serving as the prohibiting signal to control the input interruption unit 34 to perform the prohibiting operation and brings the first conductive path 31 into the non-conductive state, and outputs the second control signal serving as the discharging signal to control the charging/discharging unit 35 to perform the discharging operation, applies a voltage from the power storage unit 92 to the backup target load 94, and allows the load current to flow through the backup target load 94. In this manner, the voltage value Vout gradually decreases, and the current value Tout also decreases to the predetermined threshold Min (lower limit of a predetermined range Ra) or less.

A time T24 indicates the state where the current value Tout is the predetermined threshold Min (lower limit of a predetermined threshold Ra) or less and the voltage value Vout is smaller than the predetermined first threshold Th1. At this time, based on the fact that the voltage value Vout is smaller than the predetermined first threshold Th1 and the current value Tout is a predetermined threshold Min or less (i.e., out of the predetermined range Ra), the interruption signal generation unit 37A of the signal interruption unit 37 enters the state where no interruption signal is generated (i.e., switches the interruption signal to the high level H from the low level L). By doing so, the signal indicating that the control unit 39 is in the normal state is not interrupted by the communication interface 37B and transmitted to the external device.

A time T25 indicates the state immediately before the voltage value Vout decreases to below the predetermined first threshold Th1 by a predetermined amount, and the state immediately before the control unit 39 controls the charging/discharging unit 35 to perform the discharge stop operation. At this time, since the control unit 39 is in the state immediately before controlling the charging/discharging unit 35 to perform the discharge stop operation, the magnitude of the current flowing out from the power storage unit 92 is gradually increasing toward 0, and the current value Tout has exceeded the predetermined threshold Min (lower limit of the predetermined range Ra).

At this time, based on the fact that the current value Tout is greater than the predetermined threshold Min and smaller than 0 (i.e., within the predetermined range Ra), the interruption signal generation unit 37A of the signal interruption unit 37 enters the state where the interruption signal is generated (i.e., switches the interruption signal to the low level L from the high level H). In this manner, the communication interface 37B makes an interruption such that the signal indicating that the control unit 39 is in the normal state is not transmitted to the external device.

At a time T26, for example, when the voltage value Vout decreases to below the predetermined first threshold Th1 by a predetermined amount, the control unit 39 that is not in the normal state outputs the second control signal serving as the discharging stop signal to control the charging/discharging unit 35 to perform the discharge stop operation, brings the second conductive path 32 into the non-conductive state, and stops application of the voltage from the power storage unit 92 to the backup target load 94. Also, accompanying the stopping of the application of the voltage to the backup target load 94 from the power storage unit 92, the current value Tout becomes 0.

Hereinafter, the effects of this configuration will be illustrated.

According to this configuration, in the case where the voltage value Vout is smaller than a predetermined first threshold Th1 and the current value Tout is within a predetermined range, the signal interruption unit 37 of the control device 120 interrupts the signal to be output from the control unit 39 to the external device (the signal indicating that the control unit 39 is in the normal state), and in the case where the voltage value Vout is smaller than the predetermined first threshold Th1 and the current value Tout is out of the predetermined range, the signal interruption unit 37 does not interrupt the signal to be output from the control unit 39 to the external device.

That is, since the control device 120 can make a notification indicating the state of the power storage unit 92 to the external device by interrupting the signal to be output to the external device from the control unit 39, a notification indicating the state of the power storage unit 92 can be made to the external device without newly providing a communication line, a communication port, and the like for transmitting a signal to the external device. Also, since the voltage value Vout can be kept smaller than the predetermined first threshold Th1 and the current value Tout can be kept within a predetermined range, the time period in which the signal to be output to the external device from the control unit 39 is interrupted can be shorter.

According to the backup power supply 121 with this configuration, the specifications of the charging/discharging unit 35, the current detection unit 36, the voltage detection unit 38, the control unit 39, and the signal interruption unit 37 can be suitable to that of the power storage unit 92, and thus the performance as the backup power supply 121 can be further improved.

Accordingly, the control device 120 with this configuration and the backup power supply 121 with this configuration can also make a notification indicating the state of the power storage unit 92 to the external device while suppressing cost and size.

The current detection unit 36 of the control device 120 with this configuration detects the current flowing to the power storage unit 92 when charging the power storage unit 92.

With this configuration, by detecting the current flowing to the power storage unit 92 when charging the power storage unit 92, the control device 120 can perform control with the expectation that the power storage unit 92 will be charged, the voltage value Vout will reach a predetermined first threshold Th1, and the power storage unit 92 will enter into a state of being capable of functioning as the power supply for backing up the main power supply 91.

The current detection unit 36 of the control device 120 with this configuration detects the current flowing from the power storage unit 92 when discharging the power storage unit 92.

With this configuration, in the case where the current flowing from the power storage unit 92 when discharging the power storage unit 92 is detected, it can be determined that the control unit 39 operates normally and controls the power storage unit 92 to discharge, and the control unit 39 can communicate with the external device. Accordingly, the control unit 39 can communicate with the external device more frequently.

Other Working Examples

The present disclosure is not limited to the first and second working examples that were described in the above description and drawings, and for example, the following working examples are encompassed within the technical scope of the present disclosure.

Although the first and second working examples described that the input interruption unit performs the permitting operation or the prohibiting operation in response to an instruction from the control unit, if a configuration is used in which the connection between the main power supply and the backup target load is interrupted when the power supply fails, the input interruption unit need not be controlled by the control unit, and a configuration using a known technique can be adopted. For example, a configuration is possible in which the input interruption unit monitors the voltage of the first conductive path and determines on its own whether or not the power supply has failed, and performs the permitting operation or the prohibiting operation based on the determination result.

Although the first and second working examples described that the charging and discharging of the power storage unit are performed using the charging/discharging unit, the charging/discharging unit need not necessarily be configured by a single circuit, and a part for charging and a part for discharging may be separately provided. Also, any means for charging and discharging such as a converter, a resistance connection, a direct connection, a switch, or the like can be used as long as charging and discharging can be performed with respect to the power storage unit.

Although the first and second working examples described that the communication interface transmits or interrupts the signal indicating that the control unit is in the normal state, a configuration is also possible in which the communication interface transmits communication.

A configuration is also possible in which, a current detection signal such as the current value is input to the interruption signal generation unit, at least either of the charging or discharging of the power storage unit is performed, and when the current detection signal is in the state of indicating that the current is flowing, it is determined that the control unit is operating normally, and communication with the external device can be performed by the control unit.

Although the voltage detection unit and the current detection unit are provided in the second working example, it is also possible to use the charging/discharging unit and the power storage unit to which functions corresponding to the voltage detection unit and the current detection unit are provided, and use a signal generated using the functions provided to the charging/discharging unit and the power storage unit.

The invention claimed is:

1. An in-vehicle backup power supply control device for performing control, in an in-vehicle power supply system provided with a main power supply and a power storage unit, such that the power storage unit supplies power to a backup target load in a case where the main power supply fails, the in-vehicle backup power supply control device comprising:
 a charging/discharging unit configured to charge and discharge the power storage unit;
 a voltage detection unit configured to detect a charging voltage of the power storage unit;
 a control unit configured to output a predetermined signal to a device external to the control device; and
 a signal interruption unit configured to interrupt the output of the predetermined signal to the device external to the control device in a case where the charging voltage detected by the voltage detection unit is smaller than a predetermined threshold.

2. The in-vehicle backup power supply control device according to claim 1, wherein the control unit outputs, to the external device, a signal indicating that the control unit is in a normal state, as the predetermined signal.

3. An in-vehicle backup power supply comprising:
the in-vehicle backup power supply control device according to claim 1, and
the power storage unit.

4. The in-vehicle backup power supply as set forth in claim 3, wherein the control unit outputs, to the external device, a signal indicating that the control unit is in a normal state, as the predetermined signal.

5. An in-vehicle backup power supply control device for performing control, in an in-vehicle power supply system provided with a main power supply and a power storage unit, such that the power storage unit supplies power to a backup target load in a case where the main power supply fails, the in-vehicle backup power supply control device comprising:
a charging/discharging unit configured to charge and discharge the power storage unit;
a voltage detection unit configured to detect a charging voltage of the power storage unit;
a current detection unit configured to detect a value of a current that flows to the power storage unit or a current that flows from the power storage unit;
a control unit configured to output a predetermined signal to a device external to the control device; and
a signal interruption unit configured to interrupt the output of the predetermined signal to the device external to the control device in a case where the charging voltage detected by the voltage detection unit is smaller than a predetermined threshold and the current value detected by the current detection unit is smaller than a predetermined current threshold.

6. The in-vehicle backup power supply control device according to claim 5, wherein the control unit outputs, to the external device, a signal indicating that the control unit is in a normal state, as the predetermined signal.

7. An in-vehicle backup power supply comprising:
the in-vehicle backup power supply control device according to claim 5, and
the power storage unit.

8. The in-vehicle backup power supply as set forth in claim 7, wherein the control unit outputs, to the external device, a signal indicating that the control unit is in a normal state, as the predetermined signal.

* * * * *